United States Patent [19]
Alexander

[11] 3,924,390
[45] Dec. 9, 1975

[54] PORTABLE POWER-DRIVEN HARVESTING IMPLEMENT

[75] Inventor: Carl J. Alexander, Moore Park, Mich.

[73] Assignee: Wells Manufacturing Corporation, Three Rivers, Mich.

[22] Filed: June 7, 1974

[21] Appl. No.: 477,432

[52] U.S. Cl. .......... 56/328 TS; 280/5 A; 294/103 R
[51] Int. Cl.² ........................................ A01D 46/00
[58] Field of Search ............ 56/328 TS; 294/103 R; 280/5 A

[56] References Cited
UNITED STATES PATENTS

| | | | |
|---|---|---|---|
| 195,186 | 9/1877 | Tyner | 294/103 R |
| 3,059,402 | 10/1962 | Shipley, Jr. | 56/328 TS |
| 3,174,269 | 3/1965 | Londo | 56/328 TS |
| 3,225,529 | 12/1965 | King | 56/328 TS |
| 3,367,706 | 2/1968 | Gerrans | 294/103 R |
| 3,409,714 | 11/1968 | Strugar, Jr. | 280/5 A X |
| 3,459,269 | 8/1969 | Hunter et al. | 56/328 TS X |
| 3,838,795 | 10/1974 | Berg | 280/5 A X |

*Primary Examiner*—Paul E. Shapiro
*Attorney, Agent, or Firm*—Dressler, Goldsmith, Clement & Gordon, Ltd.

[57] ABSTRACT

A portable, self-contained harvesting implement comprises a spring-biased vibratory clamp adapted to engage a fruit-bearing tree or limb and a lightweight internal combustion engine adapted to drive the vibratory clamp. The clamp includes a fixed jaw member fixedly mounted on a stem and a movable jaw member slidably mounted on the stem. The jaw members are provided with opposing tree- or limb-receiving surfaces which are laterally spaced from the clamp stem for a distance sufficient to cause binding between the movable jaw member and the stem when the clamp is positioned about the tree or the limb.

11 Claims, 6 Drawing Figures

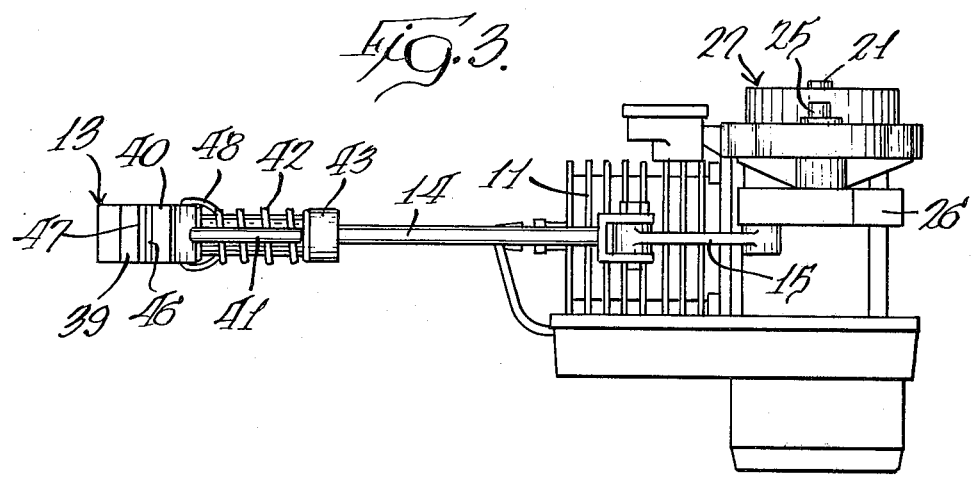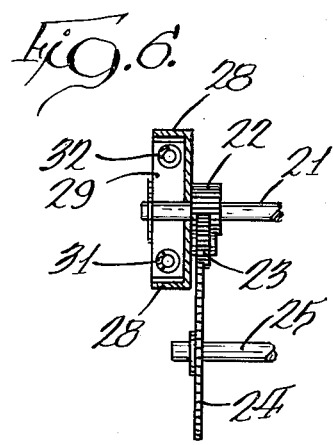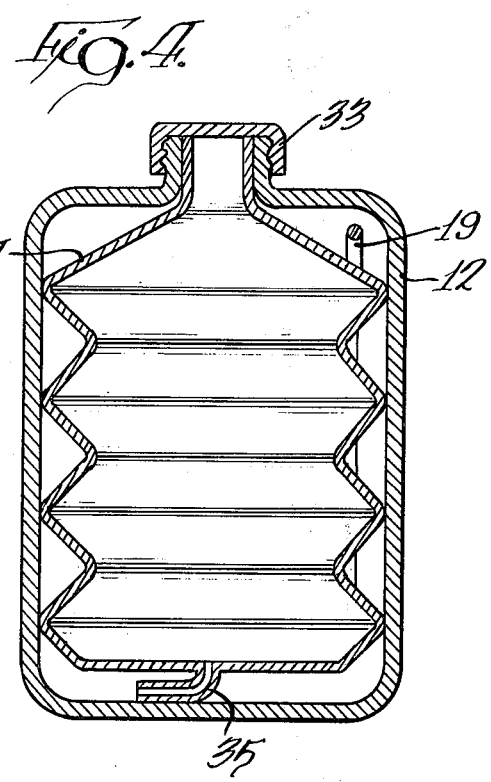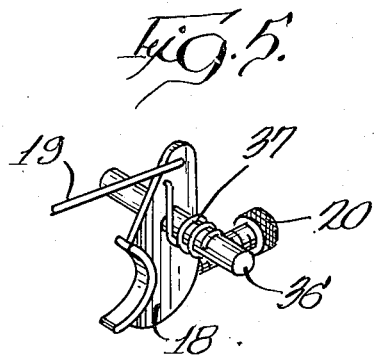

PORTABLE POWER-DRIVEN HARVESTING IMPLEMENT

BACKGROUND OF THE INVENTION

It is known to harvest fruit crops by means of mechanical implements that are either self-propelled or tractordrawn vehicles equipped with an arm means adapted to attach to the fruit-bearing tree and to shake the tree with sufficient intensity to dislodge the fruit therefrom. However, such equipment is large and cumbersome, and problems are encountered in maneuvering the equipment and attaching it to the fruit-bearing tree. Portable harvesting equipment driven by electricity or hydraulically operated has also been tried, but the need for a stationary or relatively immobile auxiliary power source limits the mobility of the equipment and also increases the cost thereof to a point where harvesting by mechanical means is not economical when compared to conventional hand harvesting. In addition, for harvesting crops such as coffee beans where the fruit-bearing bushes are grown on a sloping terrain it is extremely cumbersome to move from place to place, up and down the terrain, the auxiliary power source with leads or hydraulic hoses connected to the portable harvesting equipment in hands of the operator.

U.S. Pat. No. 3,174,269 to Londo discloses a mechanical fruit tree picker which utilizes a relatively small internal combustion engine to reciprocally drive a U-shaped member adapted to contact a branch of a fruit-bearing tree.

SUMMARY OF THE INVENTION

The present invention contemplates a self-contained, portable, lightweight harvesting implement which comprises a spring-biased vibratory clamp means adapted to snugly engage a fruit-bearing tree or limb and to impart mechanical vibrations thereto, and a lightweight internal combustion engine associated therewith and adapted to drive the vibratory means. The vibratory clamp means is readily disengageable from the tree or limb after harvesting is completed.

A preferred embodiment of the present invention comprises, in combination: a housing, a lightweight internal combustion engine situated in the housing and provided with an output shaft; reduction gear means mounted in the housing and also provided with an output shaft; centrifugal clutch means connecting the engine with the reduction gear means and adapted to engage the power output shaft of the engine with the reduction gear means when the engine has attained a predetermined number of revolutions per minute; a rigid, elongated link member, having an inner end and an outer end, slidably mounted in the housing and projecting the outer end therefrom; translational means for converting rotary motion of the reduction gear means output shaft to reciprocating motion, connected between the inner end of the link member and the reduction gear means output shaft; and spring-biased vibratory clamp means affixed to the outer end of the link member and adapted to engage firmly yet gently the fruit-bearing tree or limb.

The spring-biased vibratory clamp means comprises an elongated stem adapted for attachment to the elongated link member; a fixed jaw member fixedly mounted on the distal end of the stem substantially normal to the longitudinal axis thereof, a complementary movable jaw member slidably mounted on the stem, retainer means fixedly mounted on the stem for limiting the sliding movement of the movable jaw member, and compression spring means slidably received on the stem between the movable jaw member and the retainer means and urging the movable jaw member toward the fixed jaw member. Concave surfaces for receiving a limb or tree therebetween are provided in opposing faces of the jaw members laterally-spaced from the stem. Preferably the concave surfaces are covered with a resilient liner means. Retracting means for opening the clamp means against the urging of the compression spring means is provided on the movable jaw member, and the fixed jaw member carries a rearwardly-extending jaw alignment means which slidably engages the movable jaw member, prevents rotation thereof relative to the fixed jaw member and also serves as a positioning means guiding the limb or branch received within the clamp onto the concave surfaces thereof.

BRIEF DESCRIPTION OF THE DRAWINGS

In the drawings,

FIG. 3 is a bottom view of a harvesting implement embodying this invention with the housing thereof removed to show interior detail;

FIG. 4 is a sectional elevation taken along plane 4—4 of FIG. 2;

FIG. 5 is a perspective view showing the throttle mechanism for the implement of this invention; and FIG. 6 is a fragmentary elevational view, partly in section, taken along plane 6—6 of FIG. 2 showing a centrifugal clutch means and a reduction gear means,

DESCRIPTION OF THE PREFERRED EMBODIMENTS

Figure 1:
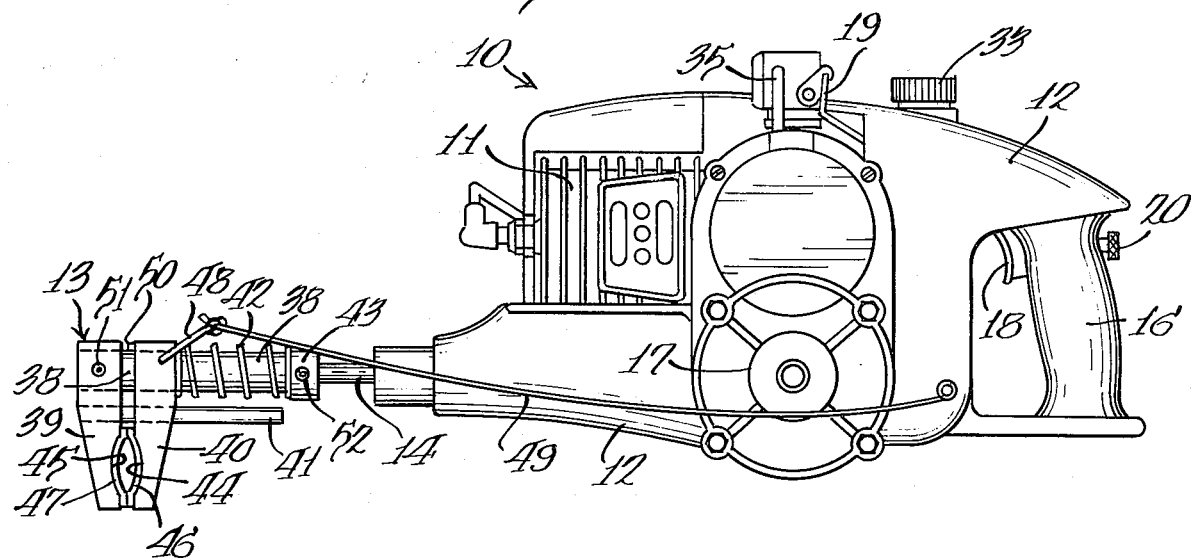
FIG. 1 is a side elevational view of the portable, self-contained harvesting implement embodying this invention.
Figure 2:
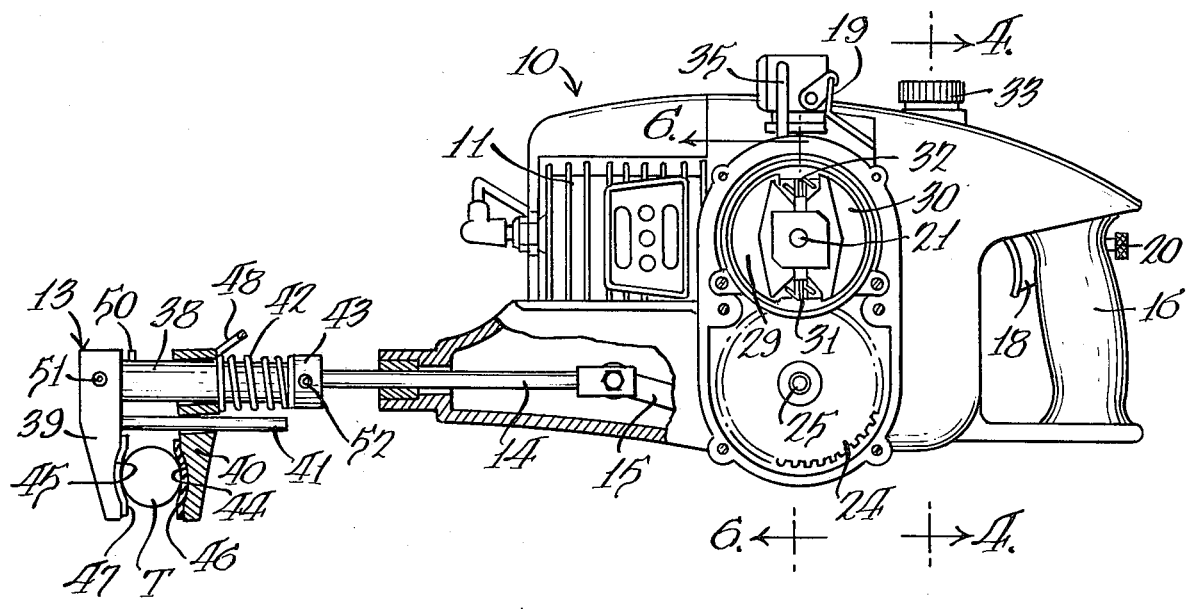
FIG. 2 is a side elevational view similar to that of FIG. i but with portions thereof broken away to show interior detail.

Referring to FIG. 1, portable, self-contained harvesting implement 10 comprises internal combustion engine 11, which can be a conventional, air-cooled two-cycle or four-cycle gasoline engine, situated in housing 12. Engine 11 is adapted to drive spring-biased vibratory clamp means 13 mounted on the outer end of link member 14 which is slidably mounted in housing 12 and is pivotally connected to connecting rod 15 (FIG. 2). Pistol grip means 16 and auxiliary handle 17 facilitate the holding and manipulating of harvesting implement 10 when in use. Trigger means 18 controls the throttling of engine 11 and is connected thereto by means of throttle linkage 19. Maximum throttle can be adjusted by means of thumbscrew 20.

Spring-biased vibratory clamp means 13 comprises elongated stem 38 connected to link member 14 at one end thereof by means of set screw 52, fixed jaw member 39 fixedly mounted on the distal end of stem 38 by means of pin 51, complementary movable jaw member 40 slidably mounted on stem 38, a retainer means such as collar 43 on stem 38 for limiting the sliding movement of movable jaw member 40, and compression spring 42 slidably received on stem 38 between collar 43 and movable jaw member 40 and urging member 40 toward fixed jaw member 39. The retainer means such as collar 43 can be machined integral with stem 38 or can be a separate part suitably mounted on stem 38. Collar 43 also reinforces the proximal end of stem 38 for connection with link member 14.

Rearwardly-extending alignment means, such as guide rod 41, is mounted on fixed jaw member 39 substantially parallel to but spaced from stem 38, and slidably engages movable jaw member 40 so as to prevent rotation of movable jaw member 40 with respect to fixed jaw member 39 without interfering with the sliding movement thereof. Guide rod 41 is slidably received in a through-aperture in movable jaw member 40; however, a pair of guide bars slidably engaging the outer side surfaces of movable jaw member 40 can be utilized as well.

Jaw members 39 and 40 extend substantially normal to the longitudinal axis of stem 38 and are provided with respective concave sufaces 45 and 44 in the opposing faces thereof. To minimize the likelihood of damage to fruit-bearing branches or limbs during harvesting, concave surfaces 44 and 45 are preferably lined with a resilient material such as a rubber, neoprene or elastomeric ployurethane sheet material in the form of liners 46 and 47. Preferably liners 46 and 47 are removably secured onto concave surfaces 44 and 45, e.g., by gluing or by providing a complementary dovetailed tongue-and-groove joint, so that the liners can be replaced when worn. Concave surfaces 44 and 45 are offset from the longitudinal axis of stem 38 for a distance sufficient to cause binding between movable jaw member 40 and stem 38 as shown in FIG. 2 when clamp means 13 holds fruit-bearing tree or limb T and is reciprocated during a harvesting operation. Guide rod 41 is also longitudinally spaced from stem 38 and further serves as a stop or positioning means which guides the limb or branch onto concave surfaces 44 and 45 and prevents the branch or limb to be received between jaw members 39 and 40 too close to stem 38 in which case the force exerted on movable jaw member 40 during use would tend to cause clamp 13 to open.

For opening spring-biased clamp 13, pivotable loop member 48 is provided on movable jaw member 40 situated so that a pulling force applied thereto acts substantially along the longitudinal axis of stem 38, thereby moving jaw member 40 rearwardly without binding. If desired, pull cord 49 can be provided between loop member 48 and housing 12. Sufficient slack is provided in pull cord 49 so as not to interfere with the normal closing operation of clamp 13.

In order to avoid inadvertent shearing of small branches by the closing action of clamp 13, stop pin 50 can be provided on stem 38 to limit the forward movement of jaw member 40 just short of abutment with jaw member 39.

As shown in FIGS. 2, 3 and 6, engine power output shaft 21 is connected for power transfer to vibratory clamp 13 by means of centrifugal clutch 27, reduction gear train comprising spur gears 22, 23 and 24, reduction gear assembly output shaft 25, crankshaft 26, connecting rod 15, and link member 14. Gear 22 is fixed to outer drum 28 of centrifugal clutch 27 and journaled on engine power output shaft 21. Rotatable, redially outwardly movable shoes 29 and 30 are mounted on the outer end of shaft 21 and are adapted to press against and engage outer drum 28 as the angular velocity of shaft 21 reaches a predetermined value. Spring means 31 and 32 determine the angular velocity at which shoes 29 and 30 will engage outer drum 28 and also serve to return shoes 29 and 30 to rest position as angular velocity of shaft 21 decreases below a predetermined value.

When outer drum 28 is engaged by shoes 29 and 30, spur gear 22 will rotate and drive spur gear 23 which is rotatably mounted on housing 12 and functions as an idler gear engaging both gear 22 and gear 24. Spur gear 23, in turn, drives spur gear 24 which is fixedly mounted on reduction gear assembly output shaft 25, thereby transferring power output from engine 11 to shaft 25 which, as a result of the reduction gear train, turns at a relatively lower angular velocity. Crankshaft 26 is fixedly mounted on shaft 25, connecting rod 15 is pivotally mounted on crankshaft 26 at an eccentric position, and the inner end of link member 14 is pivotally connected to connecting rod 15. In this manner rotational motion of engine 11 above a predetermined number of revolutions per minute is translated into reciprocating motion driving clamp 13.

A fuel tank for engine 11 is also provided within housing 12 and is accessible through an opening sealed by cap 33. Preferably the fuel tank is not vented but is collapsible, for example, such as convoluted tubular vessel 34 shown in FIG. 4, or the like. Suitable material for a collapsible fuel tank is a gasoline-compatible elastomeric material such as polyurethane, neoprene, or the like. In this manner no fuel spillage is experienced even if the harvesting implement is tilted, turned over, or otherwise operated in a position other than its normal upright position. Fuel line 35 connects tank 34 with engine 11.

A convenient throttle trigger mechanism is shown in FIG. 5. Trigger 18 is pivotally mounted on pin 36 and return spring 37 is coiled around pin 36 and is affixed to both trigger 18 and pin 36 so as to return trigger 18 to rest position when pressure thereon is released. As trigger 18 is depressed it abuts thumbscrew 20 at a predetermined throttle opening. The advantage of the foregoing arrangement is that the maximum revolutions per minute for the engine, and thus the maximum vibration frequency, can be set to avoid excessive shaking of the tree or bush being harvested. In this manner the portable harvesting implement of this invention can be set to selectively remove only the fruit that has reached a certain degree of ripeness, inasmuch as fruit having a certain degree of ripeness requires vibrations of a certain minimum frequency in order to be separated from the tree or limb, and the more ripe the fruit, the lower the required minimum frequency.

The frequency range within which the present harvesting implement can operate is determined by the reducing gear ratios that are employed. Usually the operating frequency range is 1,000 to 4,000 cycles per minute. For harvesting coffee cherries, for example, shaker frequencies in the range of about 1,400 cycles per minute to about 2,500 cycles per minute are preferred.

Stroke length for the spring-biased vibrating clamp means is not overly critical and can range from about 0.5 inches to about 2.5 inches. However, since the number of cycles required for removal of fruit at a given frequency decreases with increasing stroke, it is preferred to operate with a stroke length in the range of about 1 to about 2 inches. The particular stroke length in any given instance is determined by the eccentricity of the pivotal connection of connecting rod 15 to crankshaft 26.

The foregoing discussion and the drawings are intended as illustrative but are not to be construed as limiting. Still other variations and rearrangements of parts within the spirit and scope of this invention will readily present themselves to one skilled in the art.

I claim:

1. A portable harvesting implement which comprises in combination
   a housing;
   a lightweight internal combustion engine situated in said housing and provided with a power output shaft;
   a reduction gear means mounted in said housing and provided with an output shaft;
   a centrifugal clutch means connecting said engine with said reduction gear means and adapted to engage the power output shaft of said engine with said reduction gear means when the engine has attained a predetermined number of revolutions per minute;
   a rigid, elongated link member, having an inner end and an outer end, slidably mounted in said housing and projecting the outer end therefrom;
   translational means for converting rotary motion of said reduction gear means output shaft to reciprocating motion connected between the inner end of said link member and said reduction gear means output shaft; and
   spring-biased clamp means, adapted to engage a fruit-bearing tree or limb on the outer end of said link member and comprising an elongated stem affixed to said link member, a fixed jaw member fixedly mounted on the distal end of the stem substantially normal to the longitudinal axis thereof, a complementary movable jaw member slidably mounted on said stem, retainer means fixedly mounted on said stem for limiting the sliding movement of said movable jaw member, compression spring means slidably received on said stem between said movable jaw member and said retainer means and urging said movable jaw member toward said fixed jaw member, and a rearwardly-extending jaw alignment means mounted on said fixed jaw member spaced from said stem but substantially parallel thereto and slidably engaging said movable jaw member;
   said jaw members being provided in opposing faces thereof with concave surfaces for receiving the tree or limb therebetween, and said surfaces being laterally spaced from said stem for a distance sufficient to cause binding between said movable jaw member and said stem when the tree or limb is held therebetween.

2. The harvesting implement in accordance with claim 1 wherein said concave surfaces are provided with a resilient liner.

3. The harvesting implement in accordance with claim 1 wherein said jaw alignment means is a guide rod slidably received in a through-aperture in said movable jaw member.

4. The harvesting implement in accordance with claim 1 wherein said movable jaw member is provided with a loop member for opening said clamp means.

5. The harvesting implement in accordance with claim 4 wherein a pull cord is attached between said loop member and said housing.

6. The harvesting implement in accordance with claim 1 wherein a stop pin is provided on said stem for limiting forward movement of said movable jaw member.

7. The harvesting implement in accordance with claim 1 wherein the light-weight internal combustion engine is a two-cycle gasoline engine.

8. A harvesting implement in accordance with claim 1 wherein a collapsible, convoluted, tubular and ventless fuel tank for said engine is situated within said housing.

9. The harvesting implement in accordance with claim 1 wherein the reduction gear means comprises a gear train consisting of first, second and third spur gears, the first gear being fixed to the centrifugal clutch and journaled on said engine power output shaft, the third gear being fixedly mounted on an output shaft journaled in said housing, and the second gear being an idler gear engaging both the first and the third gears and rotatably mounted on said housing.

10. The harvesting implement in accordance with claim 1 wherein the translational means comprises a crankshaft mounted on the reduction gear means output shaft and a connecting rod pivotally mounted on said crankshaft at an eccentric position and pivotally connected to the inner end of said link member.

11. A portable harvesting implement which comprises in combination
    a housing;
    a lightweight internal combustion engine situated in said housing and provided with a power output shaft;
    a reduction gear means mounted in said housing and provided with an output shaft;
    a centrifugal clutch means connecting said engine with said reduction gear means and adapted to engage the power output shaft of said engine with said reduction gear means when the engine has attained a predetermined number of revolutions per minute;
    a rigid, elongated link member, having an inner end and an outer end, slidably mounted in said housing and projecting the outer end therefrom;
    translational means for converting rotary motion of said reduction gear means output shaft to reciprocating motion connected between the inner end of said link member and said reduction gear means output shaft; and
    spring-biased clamp means, adapted to engage a fruit-bearing tree or limb on the outer end of said link member and comprising an elongated stem affixed to said link member, a fixed jaw member fixedly mounted on the distal end of the stem substantially normal to the longitudinal axis thereof, a complementary movable jaw member slidably mounted on said stem, stop means positioned between said fixed jaw member and said movable jaw member for limiting forward movement of movable jaw member short of abutment with fixed jaw member, retainer means fixedly mounted on said stem for limiting the sliding movement of said movable jaw member, compression spring means slidably received on said stem between said movable jaw member and said retainer means and urging said movable jaw member toward said fixed jaw member, and a rearwardly-extending jaw alignment means mounted on said fixed jaw member spaced from said stem but substantially parallel thereto and slidably engaging said movable jaw member;
    said jaw members being provided in opposing faces thereof with concave surfaces for receiving the tree or limb therebetween, and said surfaces being laterally spaced from said stem for a distance sufficient to cause binding between said movable jaw member and said stem when the tree or limb is held therebetween.

* * * * *